United States Patent

[11] 3,607,952

| [72] | Inventor | Kung Hsing Lee<br>Wilmington, Del. |
|---|---|---|
| [21] | Appl. No. | 811,668 |
| [22] | Filed | Mar. 28, 1969 |
| [45] | Patented | Sept. 21, 1971 |
| [73] | Assignee | E.I. du Pont de Nemours and Company<br>Wilmington, Del. |

[54] PROCESS FOR PREPARATION OF HEXAFLUOROISOPROPANOL
7 Claims, No Drawings

| [52] | U.S. Cl. | 260/633 |
|---|---|---|
| [51] | Int. Cl. | C07c 31/34 |
| [50] | Field of Search | 60/633, 638 B |

[56] References Cited
UNITED STATES PATENTS

| 2,824,897 | 2/1958 | Wujciak | 260/633 |
|---|---|---|---|
| 3,189,656 | 6/1965 | Gordon et al. | 260/633 |
| 3,418,337 | 12/1968 | Middleton | 260/633 X |
| 3,468,964 | 9/1967 | Swamer | 260/633 |

FOREIGN PATENTS

| 1,269,605 | 6/1968 | Germany | 210/638 B |
|---|---|---|---|

*Primary Examiner*—Howard T. Mars
*Attorney*—Francis J. Crowley

ABSTRACT: A process for reducing hexafluoroacetone to hexafluoroisopropanol with hydrogen and a noble metal containing reduction catalyst in the presence of a hexafluoroisopropanol reaction diluent, using hydrogen pressure of 10 to 50 atm., and catalyst concentrations of from about 0.1% to 1.0% based on the weight of hexafluoroacetone used.

PROCESS FOR PREPARATION OF HEXAFLUOROISOPROPANOL

BACKGROUND OF THE INVENTION

1. Field of the Invention

This invention relates to the preparation of hexafluoroisopropanol by reduction of hexafluoroacetone and more particularly to an improved process for preparation of hexafluoroisopropanol at nonelevated pressures and low catalyst concentrations.

2. Description of the Prior Art

Middleton, in U.S. Pat. No. 3,418,337, teaches a process for reducing hexafluoroacetone to hexafluoroisopropanol using platinum oxide catalyst and hydrogen at pressures of 50 to 3,000 atm. wherein hexafluororacetone, catalyst and hydrogen are heated together at 100°–175° C. It would be desirable to lower pressure for purposes of convenient use in commercial scale equipment. Generally, autoclaves which can handle elevated pressures are rather small, and thus a process requiring lower hydrogen pressures would eliminate a possible necessity for batch size restriction in production runs. Attempts to use lower pressures, e.g., less than 50 atm., which would allow the use of larger scale commercial equipment in the process of Middleton, require either high catalyst concentrations, i.e., 2% or more, which greatly increase overall production cost, long reaction time, e.g., 9 or more hours or both to obtain acceptable conversions. When lower catalyst concentrations are used, the reaction does not proceed unless the high temperatures and pressures taught by Middleton are used.

A process has now been discovered which will operate at pressures of less than 50 atm. at convenient temperatures and at economically practical catalyst concentrations to reduce hexafluoroacetone to hexafluoroisopropanol with a high conversion percentage yield.

SUMMARY OF THE INVENTION

The present invention comprises a process whereby a mixture of hexafluoroacetone and a noble metal containing reduction catalyst are hydrogenated in the presence of a hexafluoroisopropanol reaction diluent to produce hexafluoroisopropanol. The reaction takes place at hydrogen pressures of from about 10 to 50 atmospheres, and catalyst concentrations of from about 0.1% to 1.0% based on weight of hexafluoroacetone used.

Description of the Invention

It has been discovered that the reduction of hexafluoroacetone to hexafluoroisopropanol with hydrogen and a noble metal containing reduction catalyst can be carried out at pressures less than 50 atm., temperatures less than about 120° C. and with catalyst concentrations less than 1% if a reaction medium, particularly hexafluoroisopropanol, is present initially. Under such conditions, reduction is essentially complete (i.e., about 95%) in 2 to 4 hours.

In general, temperatures of about 30° to 120° C. are used, and temperatures of 50° to 80° C. are preferred. Catalyst concentrations may range from about 0.1% to 1.0% based on weight of hexafluoroacetone but are preferably 0.1% to 0.8% and pressures may range from about 10 to 50 atm. but are preferably 15 to 42 atm. Reaction times generally range from about 2 to 4 hours.

Most noble metal containing reduction catalysts can be used in this process and some useful examples are platinum metal, palladium metal, platinum oxide, palladium oxide; or platinum or palladium on a carbon support or platinum or palladium metal on an alumina support. Platinum oxide is convenient and therefore preferred.

The amount of hexafluoroisopropanol used as a reaction diluent is not critical as long as a sufficient amount is present to form a slurry of the catalyst. In general, from about 5% to 50% on the weight of hexafluoroacetone is useful, 5% to 25% being preferred.

There are a number of other reaction diluents which might prove useful in a reaction of this type, for example, dioxane, tetrahydrofuran and certain other ethers, or hydrocarbons such as hexane or cyclohexane, or water. Hexafluoroisopropanol, however, offers an advantage over these in that it is identical to the end product and hence no separation is required.

Commercial grade hexafluoroacetone may contain small amounts of hydrogen fluoride or sulfur dioxide. These should be removed beforehand, if present, as they will poison the catalyst system. Sulfur dioxide is conveniently removed by passing the hexafluoroacetone through a suitable molecular sieve bed and hydrogen fluoride is conveniently removed by passing the hexafluoroacetone through a bed of sodium fluoride pellets.

If a series of reductions are to be carried out, it is especially convenient to proceed in the following manner. When reduction is essentially complete, the reaction charge is cooled and the catalyst is allowed to settle. The product hexafluoroisopropanol is then discharged from the vessel via a blow leg, leaving most of the catalyst and a heel of hexafluoroisopropanol in the vessel. The fresh hexafluoroacetone and catalyst as needed are added and the process is repeated until the catalyst itself is spent.

Any small amounts of suspended catalyst are then removed, e.g., by filtration and any unconverted hexafluoroacetone present in separated out, e.g., by distillation.

The following examples describe the invention in further detail. These examples are intended to be merely illustrative of the invention and not in limitation thereof. Unless otherwise indicated all parts are by weight.

EXAMPLE 1

A slurry of 112 parts of platinum oxide in 1,000 parts of hexafluoroisopropanol was prepared in a suitable pressure vessel. The vessel was sealed and 13,847 parts of hexafluoroacetone were added, (catalyst concentration 0.8%, hexafluoroisopropanol concentration 7.23%, both on weight of hexafluoroacetone). Hydrogen was admitted at 27.2 atm. pressure and the vessel was heated to 55°–80° C. Hydrogen pressure varied between 27.2 and 40.8 atm. Reduction was essentially complete in 2 hours. Then, the catalyst was allowed to settle and the charge was cooled and discharged via a blow leg, leaving the catalyst and about 2,000 parts of hexafluoroisopropanol in the vessel. Four additional charges of hexafluoroacetone were reduced in succession in the same manner without addition of further catalyst but at slightly different temperatures and pressures. The conditions established for all five runs are summarized below.

| Charge No. | Parts Hexafluoroacetone charged | Parts Hexafluoroisopropanol yield | Temp., ° C. | Pressure, atmospheres | Time, hrs. |
|---|---|---|---|---|---|
| 1 | 13,847 | 10,987 | 55–80 | 27–2, 40.8 | 2 |
| 2 | 14,982 | 15,072 | 56–120 | 20.4–47.6 | 2.5 |
| 3 | 14,845 | 13,393 | 50–95 | 13.6–47.6 | 4 |
| 4 | 14,982 | 15,572 | 55–110 | 13.6–47.6 | 2.5 |
| 5 | 14,982 | 14,256 | 55–120 | 13.6–47.6 | 4 |

The overall yield (conversion) for the five charges was 68,580 parts for an overall % yield of 93.1%. Catalyst concentration varied between the runs from 0.75% to 0.8%.

EXAMPLE 2

Hexafluoroacetone (300 parts) and 6 parts of platinum oxide (2%) were charged into a suitable pressure vessel. The sealed vessel was pressured to 20.4 atm. with hydrogen at 30° C. The temperature was raised to 60° C. (hydrogen pressure increasing to 40.8 atm.) After 9.8 hours, reaction stopped. A total of 293 parts (97.7%) of hexafluoroisopropanal was recovered.

When the above procedure was repeated using 1.5 part (0.5%) of platinum oxide catalyst, a total of 151 parts (50.3%)

of hexafluoroisopropanol were recovered after 16 hours reaction time. Thus it can be clearly seen that without the presence of the hexafluoroisopropanol reaction diluent an effective reduction at nonelevated pressures can be accomplished only by use of greatly increased concentrations of costly catalyst.

EXAMPLE 3

An attempt to reduce 13847 parts of hexafluoroacetone using 12 parts platinum oxide (0.087%) at 40.8 atm. hydrogen pressure in the manner of Example 2 failed to effect any reduction. When the temperature was increased to try and force reduction to occur, pressure increased rapidly, making pressure control extremely difficult. This reemphasises the point that, absent the hexafluoroisopropanol diluent, the reduction will either not take place or not render good yields at nonelevated temperatures and low catalyst concentrations.

The embodiments of an invention in which an exclusive property or privilege is claimed are defined as follows:

1. In the process for reducing hexafluoroacetone to hexafluoroisopropanol by hydrogenating hexafluoroacetone in the presence of a noble metal containing reduction catalyst at elevated temperature and pressure, the improvement which comprises hydrogenating said hexafluoroacetone in a reaction zone initially containing from about 5 to 50 percent hexafluoroisopropanal, based on the weight of hexafluoroacetone as a reaction diluent and at hydrogen pressures of from about 10 to 50 atmospheres within a temperature range of from about 30° C. to 120° C. and with catalyst concentration of from 0.1% to 1.0% based on the weight of hexafluoroacetone used.

2. The process of claim 1 wherein the hydrogen pressure is maintained at from about 15 to 42 atmospheres.

3. The process of claim 1 wherein the catalyst concentration is from 0.1% to 0.8%.

4. The process of claim 1 wherein the noble metal catalyst is selected from platinum, palladium, platinum oxide, palladium oxide, platinum or palladium on carbon and platinum or palladium on alumina.

5. The process of claim 4 wherein the noble metal catalyst is platinum oxide.

6. The process of claim 1 wherein the hexafluoroisopropanol reaction diluent is present in an amount of from about 5% to 50% based on the weight of hexafluoroacetone used.

7. The process of claim 6 wherein the hexafluoroisopropanol reaction diluent is present in an amount of from about 5% to 25% based on the weight of hexafluoroisopropanol.